US011487098B2

(12) United States Patent
Abrantes Guedes Da Fonseca Pereira

(10) Patent No.: US 11,487,098 B2
(45) Date of Patent: Nov. 1, 2022

(54) DEVICE FOR IMPROVING PERFORMANCE IN STED AND RESOLFT MICROSCOPY USING A SINGLE PHASE MASK

(71) Applicant: IBMC—INSTITUTO DE BIOLOGIA MOLECULAR E CELULAR, Oporto (PT)

(72) Inventor: António José Abrantes Guedes Da Fonseca Pereira, Guimarães (PT)

(73) Assignee: IBMC—INSTITUTO DE BIOLOGIA MOLECULAR E CELULAR, Oporto (PT)

( * ) Notice: Subject to any disclaimer, the term of this patent is extended or adjusted under 35 U.S.C. 154(b) by 86 days.

(21) Appl. No.: 17/056,612

(22) PCT Filed: May 17, 2019

(86) PCT No.: PCT/PT2019/050012
§ 371 (c)(1),
(2) Date: Nov. 18, 2020

(87) PCT Pub. No.: WO2019/221622
PCT Pub. Date: Nov. 21, 2019

(65) Prior Publication Data
US 2021/0208379 A1 Jul. 8, 2021

(30) Foreign Application Priority Data
May 18, 2018 (PT) .......................... 110747

(51) Int. Cl.
*G02B 21/00* (2006.01)
*G02B 21/36* (2006.01)
*G02B 27/58* (2006.01)

(52) U.S. Cl.
CPC ....... *G02B 21/361* (2013.01); *G02B 21/0032* (2013.01); *G02B 27/58* (2013.01)

(58) Field of Classification Search
CPC ... G02B 21/361; G02B 21/0032; G02B 27/58
See application file for complete search history.

(56) References Cited

U.S. PATENT DOCUMENTS 9,507,135 B2 * 11/2016 Iketaki .............. G02B 21/0032
2008/0007730 A1 * 1/2008 Kempe ............. G02B 21/0056
356/318

(Continued)

OTHER PUBLICATIONS

Mikael P. Backlund et al., "The double-helix point spread function enables precise and accurate measurement of 3D single-molecule localization and orientation", Proceedings of SPIE, Feb. 22, 2013, 17 pgs., vol. 8590.

(Continued)

*Primary Examiner* — Zhihan Zhou
(74) *Attorney, Agent, or Firm* — Sughrue Mion, PLLC

(57) ABSTRACT

The present invention refers to a method for high spatial resolution imaging comprising a phase plate or a spatial light modulator (SLM) device for STimulated Emission Depletion (STED) microscopy and Reversible Saturable OpticaL Fluorescence Transitions (RESOLFT) microscopy, where a bivortex pattern is imprinted on the said phase plate or SLM to generate a beam. The bivortex pattern allows some freedom in shaping the STED beam to improve the microscope's axial performance and optical sectioning capacity. The present invention further refers to a method for STED and RESOLFT microscopy comprising the step of modulating the optical phase of a laser using a phase plate or a spatial light modulator device with a phase mask comprising a bivortex with a tunable radius.

The disclosed phase masks and methods of STED and RESOLFT microscopy may advantageously be applied to provide a hybrid 2D/3D STED regime but one with a significant reduction in the degrees of freedom for alignment relative to what is found in incoherent beam superpositions, (Continued)

limit circle defined by lens radius thus providing an improvement in beam quality, namely a minimized central intensity and lower sensitivity to aberrations, resulting in an increased signal level and axial performance.

13 Claims, 2 Drawing Sheets

(56) References Cited

U.S. PATENT DOCUMENTS

| | | | |
|---|---|---|---|
| 2013/0147925 A1* | 6/2013 | Lew | H04N 13/204 348/49 |
| 2015/0076333 A1* | 3/2015 | Guillon | G02B 21/0056 250/234 |
| 2016/0291343 A1* | 10/2016 | Prasad | G02B 21/36 |
| 2018/0209905 A1* | 7/2018 | Iketaki | G02B 21/14 |
| 2019/0011367 A1* | 1/2019 | Hell | G02B 21/0076 |
| 2020/0310095 A1* | 10/2020 | Netz | G02B 21/0068 |

OTHER PUBLICATIONS

International Search Report for PCT/PT2019/050012 dated Aug. 29, 2019 (PCT/ISA/210).
Written Opinion of the International Searching Authority for PCT/PT2019/050012 dated Aug. 29, 2019 (PCT/ISA/237).

* cited by examiner limit circle defined by lens radius

DEVICE FOR IMPROVING PERFORMANCE IN STED AND RESOLFT MICROSCOPY USING A SINGLE PHASE MASK

TECHNICAL FIELD OF THE INVENTION

The present invention refers to a phase plate or a spatial light modulator device for STimulated Emission Depletion (STED) and Reversible Saturable OpticaL Fluorescence Transitions (RESOLFT) microscopy, which results from the imprinting of a bivortex mathematical function on a single phase mask that allows shaping the STED beam to deliver an improved axial performance, increased resolution and signal level.

Thus, the present invention falls within the technical field of Physics, Instruments, Optics and Devices or Arrangements for the control of the phase of light.

STATE OF THE ART

Fluorescence microscopy is conventionally limited to a resolution of approximately one half of the wavelength of the radiation used to excite the fluorescent sample. This is known as the 'diffraction limit'. Some techniques have been developed which circumvent this limit by harnessing the non-linear response of the fluorophores to light, such as in the family of Reversible Saturable OpticaL Fluorescence Transitions (RESOLFT) techniques. Among this family, the particular case of stimulated emission depletion (STED) microscopy (Hell and Wichmann, 1994, Klar et al., 2000) surpasses the diffraction limit by depleting the peripheral areas of the excited spot before they can spontaneously emit fluorescent light. This depletion is achieved by the process of stimulated emission and is usually implemented by hitting the sample with a so-called 'STED beam', which features a central dark spot surrounded by regions of high intensity (Keller et al., 2007). As a result, only the central part of the excited spot will survive the action of the STED depletion beam and thus eventually fluoresce. In an analogous manner, the RESOLFT method family (of which STED is a particular case) equally demands the use of a beam with a central dark spot and with a similar intensity pattern. The STED method is used here as a paradigmatic example in the discussion of the generation of RESOLFT beams.

Typical implementations of STED microscopy use one or two phase masks which are placed approximately at (or approximately at a plane conjugate to) the back focal plane of the microscope objective. The device that defines the phase mask can be either a structured plate (polymer or glass, for example) or a dynamically addressable device (such as spatial light modulator). The particular STED beams provided by the action of these phase masks define two standard STED modes: 2D STED and 3D STED. The latter is sometimes alternatively called z-STED. As described in more detail below, pure 2D and 3D STED are discrete modes with complementary performance merits A more isotropic depletion can be achieved by combining the 2D and 3D modes, which has required the use of two phase masks (Harke et al., 2008). This hybrid mode works by performing an incoherent superposition of two beam components and is implemented in several custom and commercial STED systems, with different strategies being used to tackle the inherent misalignment issues that arise from the fact that two independent beam components must be made to precisely coalesce at the sample.

Conventional 2D STED uses a helical ramp phase mask to create a doughnut-shaped beam featuring an intensity null along the optical axis with a higher intensity ring around this axis, displaying a deep and steep intensity profile (Keller et al., 2007, Torok and Munro, 2004). Subjected to this depletion profile, the fluorescence source becomes thinner in the XY plane, routinely achieving a lateral dimension well below one tenth of the depletion beam wavelength (Westphal and Hell, 2005). However, this 2D STED method does not improve axial resolution (typ. >500 nm) or optical sectioning, with these remaining bound to the conventional confocal microscopy levels.

These aspects (axial resolution, optical sectioning) can however be improved using a 3D STED beam (Klar et al., 2000), which depletes the excitation spot preferentially above and below the focal plane, along the optical axis. This operational mode is very effective at improving axial resolution. However, it does so at the expense of a significantly weaker improvement in lateral resolution and a more inefficient depletion of secondary excitation areas, as compared to the 2D STED mode, making 3D STED inherently noisier than 2D STED. Additionally, the dimension of the 3D STED phase mask must be precisely tuned and aberrations must be well controled so that a central intensity-zero is indeed formed.

2D and 3D STED are thus discrete modes of operation with complementary attributes regarding shrinkage of the effective fluorescent source. None excels by itself at shrinking the fluorescence source isotropically. However, as long as the 2D and 3D STED beams are made significantly incoherent, their intensity profiles can be added to obtain a hybrid mode which allows more isotropic shrinkage of the fluorescent source. Thus, this incoherent hybrid (IH) STED mode requires the use of more than one phase mask. The 2D, 3D and IH STED are implemented in many STED systems, including those commercially available. The fact that IH STED requires the use of two phase masks, means that the central zeros of the transformed beams (the STED beams) must be critically aligned. Beam imperfections and relative misaligments in IH STED generate complex compound aberration effects, as well as an unwanted filling up of the central zero (Antonello et al., 2016, Booth et al., 2015), which compromises resolution improvement, decreases detectable signal and may compromise symmetry of the depletion.

A tunable hybrid mode that is able to provide 2D-level lateral resolution and better-than-2D STED isotropy, while avoiding the use of multiple phase masks, is missing from the prior art and from the STED toolbox.

These facts are disclosed in order to illustrate the technical problem addressed by the present disclosure.

SUMMARY OF THE INVENTION

The present invention refers to a phase plate or spatial light modulator device for Stimulated Emission Depletion (STED) and Reversible Saturable OpticaL Fluorescence Transitions (RESOLFT) microscopy characterized by, a bivortex profile comprising two vortex sections, one inner disc-shaped vortex and one outer ring-shaped vortex, in a single phase mask.

In another embodiment of the present invention, the phase plate or spatial light modulator device is characterized by, a phase step between the inner vortex and the outer vortex, according to the radius of each vortex, with the inner vortex radius being most preferably smaller than the radius of the outer vortex.

In another embodiment of the present invention, the phase plate or spatial light modulator device is characterized by, comprising a bivortex profile where the phase step at the transition between the two vortices has a magnitude between 0 and $2n\pi$ radians, most preferably $(2n+1)\pi$ radian, where n is any natural number.

In another embodiment of the present invention, the phase plate or spatial light modulator device is characterized by, comprising a smoothened inter-vortex transition.

In another embodiment of the present invention, the phase plate or spatial light modulator device is characterized by, comprising more than 2 vortex structures.

In another embodiment of the present invention, the phase plate or spatial light modulator device is characterized by, comprising an arbitrary phase mask within or outside the bivortex regions.

The present invention also refers to a method for STED and RESOLFT microscopy characterized by, comprising the step of: modulating the phase of the radiation using of a phase plate or a spatial light modulator device generating a phase mask, as described above.

The present invention also refers to a method for STED and RESOLFT microscopy characterized by, comprising a step of: modulating the optical phase of a radiation beam using compensation or corrective phase functions on the phase plate or a spatial light modulator device to generate an effective phase mask, as mentioned above.

The phase masks and methods disclosed for STED and RESOLFT microscopy may advantageously be applied to provide a significant reduction in the degrees of freedom for alignment and a consequential improvement in beam quality, namely a minimized central intensity, and result in a significantly improved axial performance, increased resolution and signal level. They may equally provide an improved optical sectioning performance relative to the 2D STED mode.

DESCRIPTION OF THE INVENTION

The present invention discloses a phase plate for STED and RESOLFT that results from the imprinting of a new bivortex mathematical function on a single phase mask or on a phase plate that allows some freedom in shaping the beam to a 2D/3D hybrid regime and results in a significantly improved axial performance. Here the STED operation mode provided by the action of the bivortex phase mask or phase plate is called 'coherent-hybrid STED' (CH-STED).

A clear advantage of the CH-STED phase mask is a significant reduction in the degrees of freedom for alignment and the consequential improvement in beam quality, namely a minimized central intensity, with an increased signal level In one embodiment of the present invention, the 2D STED laser beam is transformed by the phase plate to achieve axial super-resolution and better-than-confocal optical sectioning with one phase mask only. In the preferred embodiment, the CH-STED is characterized by a bivortex phase mask or phase plate profile comprising two vortex sections (also known as helical phase ramps): one inner and one outer vortex. The mathematical function representing the phase delay ($\phi$) of the bi-vortex phase mask is:

$$\phi(r, \theta) = \begin{cases} n\theta & \text{if } r < r_1 \\ n\theta + a\pi & \text{if } r_2 > r > r_1 \end{cases} \quad \text{(Eq. 1)}$$

where r is the perpendicular distance to the optical axis, $\theta$ is the azimuthal angle and $r_1$ and $r_2$ define the radius of the inner and the outer vortex, respectively (FIG. 1a), n is an integer which equals 1 for best resolution and a, which defaults to 1, is a free parameter which can be used to refine the axial distribution of the beam. In practice, $r_2$ is defined by the optical system transverse dimension (FIG. 1b), which limits the effective radius of the imprinted phase element.

In another embodiment of the present invention, the STED beam's transformation in the phase mask or plate for CH-STED, is characterized by comprising a parameter defined by $$c = r_1/r_2,$$

which spans a range between 0 and 1.

CH-STED tends to the 2D STED regime when c approaches 1. This limit mode is understood by noting that in this case the microscope lens finite size does not allow the information derived from the outer vortex section to be transmitted to the sample plane, leaving a single vortex operating on the effective beam, as in 2D STED. Similarly, it can be noted that the family of bivortex functions defined by Eq. 1 becomes a standard 2D STED mode when a tends to a multiple of 2 (including 0), in which case the mask degenerates to a single vortex because the phase step between vortices vanishes.

When leaving the pure 2D regime, which occurs for example by decreasing the parameter c below 1, lateral resolution gradually drops below the 2D STED baseline, unless STED beam power is increased. This is accompanied by an increase in optical sectioning, as well as in axial resolution. This can be seen from the fact that the CH-STED beam not only passively attenuates signal from above and below the focal plane (as a pinhole does in a confocal microscope), but actively depletes it, thus acting as a super-resolution element. The qualitative change observed in CH-STED is therefore a switch of the intensity contour lines from convex to concave, as observed from the nodal point (FIG. 2), thus generating a degree of axial confinement which is absent in the 2D mode. This transformation can be visualized as a deletion of the edges of the 2D depletion beam around and close to the focal point (FIG. 2).

The generated bivortex phase mask (Eq. 1 and FIG. 1) provides the base structure that delivers qualitative improvement in axial performance (optical sectioning, axial resolution) over the pure 2D STED mode (FIG. 3).

Importantly, the performance is not compromised by applying some transformations to its structure (see. FIG. 4), namely:
  smoothening of the inter-vortex transition
  addition of further vortex functions
  inclusion of an arbitrary phase function within the bivortex
  addition of an arbitrary function outside the bivortex region In general, the improvement described in this invention occurs whenever a vortex section within an arbitrary phase mask profile is replaced by a bivortex, independently of the remaining structure of the phase mask.

Further, in another embodiment of the present invention the bivortex can be defined by a complete $\pi$ radians inter-vortex transition (a=1, as in FIGS. 4 a,b) or an incomplete one (a≠1, FIG. 4c), as it does not compromise the generation of the required dark spot in the center.

A CH-STED phase mask is able to, without requiring a plurality of masks, provide a more isotropic shrinkage of the effective fluorescent source than the 2D or 3D masks alone. However, this invention does not preclude or limit the use of additional masks in order to generate beams with specific features through combinations thereof. As an example, the IH STED, which typically uses a phase plate with one 2D STED and one 3D STED phase mask, can be used to combine the CH-STED mask with the 2D STED mask. Any other combination is still allowed, the main characteristic being that at least one of the phase masks or phase plate uses a phase function which comprises a bivortex.

The action of the CH bivortex phase mask described above is embodied in a physical phase modulating device that is placed along the path of the STED laser beam. The device that defines the phase mask can be either a structured plate (comprising structured polymer or glass, for example) or a dynamically addressable device (such as spatial light modulator). The different sections of the optical beam that passes through the device will suffers phase shifts according to the CH phase mask imprinted, thereby transforming the beam.

The transformed beam pattern displays the desired characteristics when the phase mask is placed in a plane conjugate to the back-aperture of the imaging objective of the microscope, although shifts from this regime do not fundamentally compromise the performance of the method.

In another embodiment of the present invention, a method for STED and RESOLFT microscopy can be developed comprising the step of: modulating the phase of a laser beam using of a phase plate or a spatial light modulator device generating a phase mask as described above.

In another embodiment of the present invention the CH phase masks used in the present invention comprise a modulation of the phase plate or a spatial light modulator according to instrumental characteristics of the optical setup. For example, a sine wave phase component can be included in the imprinted phase mask function to allow tuning the beam direction after passing through the phase modulating device. Also, an instrumental function known as flat-field correction can be included to compensate for the particular shape of the original (non-transformed) beam or, more generally, any aberration-compensation function can be used. The essential feature that characterizes the present invention is that the phase function comprises a bivortex phase mask (FIG. 4). As in optics jargon, the bivortex phase function may be said to be an 'effective' phase mask or one component of it.

Thus, another embodiment of the present invention a method for STED and RESOLFT microscopy can be developed by comprising a step of: modulating the physical phase of a laser beam using compensation or corrective phase functions on the phase plate or a spatial light modulator device to generate an effective phase mask as described above.

EXAMPLES

Figure 1:
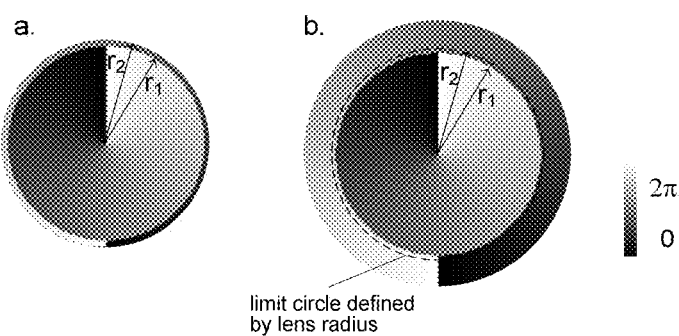
FIG. 1: Drawings of the default bivortex phase mask. a) The effective phase plate's mask function is defined as a disc-shaped vortex surrounded by a ring-shaped vortex. The line separating the two sections (at a radius r1) defines a phase shift of □. b) In practice, the (outer) ring vortex can have an arbitrary radius larger than r2, with the microscope lens geometry typically limiting the effective radius of the phase function to r2.
Figure 2:
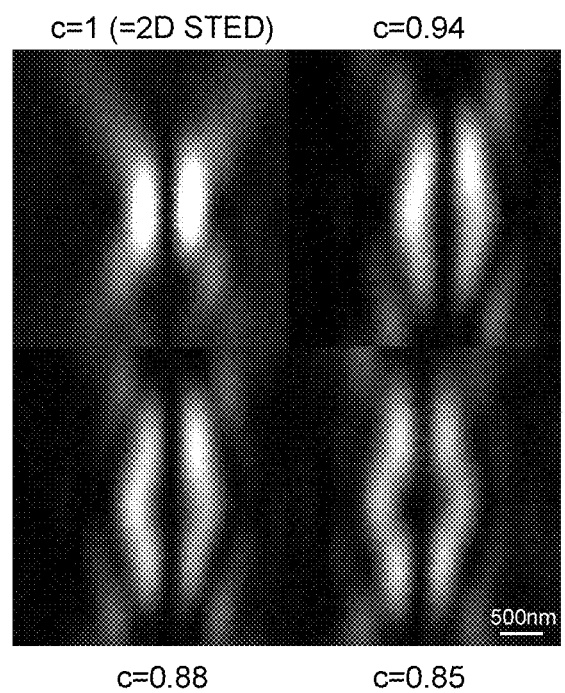
FIG. 2: CH-STED depletion beam generated by a phase plate comprising a bivortex phase mask. Images show signal scattered by gold nanobeads when scanned by the STED depletion laser. These images are thus representations of the STED beam geometry cross-section. Transformation of the CH-STED depletion beam is observed by decreasing the parameter c below 1. Morphological changes are mainly characterized by a widening of the dark central spot, which occurs selectively at the focal plane along with a global elongation of the beam's focal structure.
Figure 3:
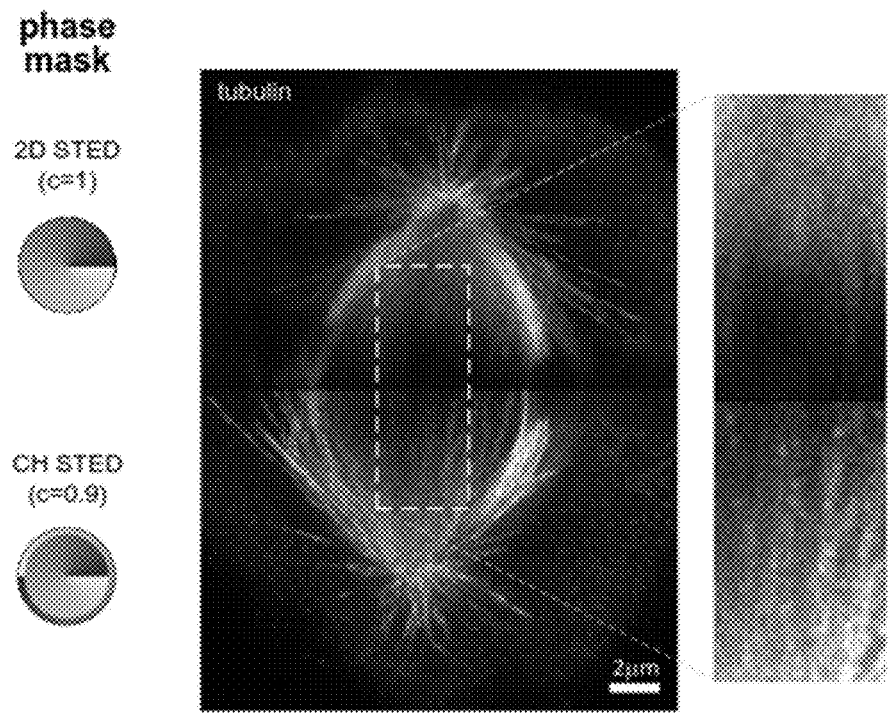
FIG. 3: CH-STED employing the bivortex phase mask for imaging of a mitotic spindle. Top half mitotic spindle is imaged with 2D STED (which corresponds to CH STED with c=1), which is switched to CH STED in the bottom half (c<1). All other acquisition parameters remain unchanged. It can be seen that, although some xy resolution loss is expected when decreasing c below 1, the redistribution of the depletion beam becomes more effective at exposing the filaments composing the object due to an improved axial performance, with an elongated depletion volume. When required, the loss in xy resolution is compensated by an increase of the depletion laser power.
Figure 4:
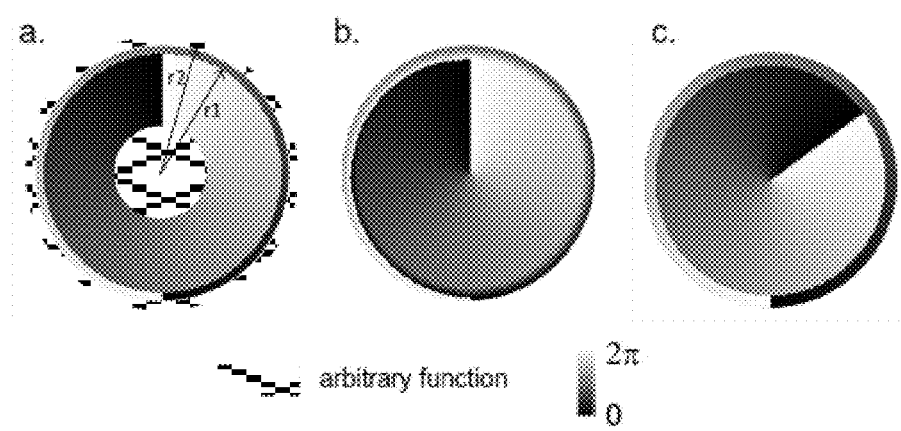
FIG. 4: Illustrative embodiments comprising the bivortex phase function imprinted into the phase plate. a) Example of aCH-STED phase mask where arbitrary functions are added inside and/or outside the bivortex phase function. b) Example of a mask function where the phase transition between two sections of the bivortex is smoothened by convolution. c) Example of the phase plate's bivortex phase mask when the two vortices are shifted by a value aπ with a different from 1.

Example 1: Production of a Phase Plate Generating the Bivortex Phase Mask

In an example, the bivortex phase mask of the present invention is generated by a phase plate device. Such device can be produced by crafting the negative of the bivortex phase mask of the present invention's phase plate onto a mold and by developing the mold to obtain a bivortex phase plate. The manufacture by molding may be achieved by methods known in the art, for example those described by Oemrawsingh et al, 2004, with the addition of comprising a step of: designing the mold as a negative of the present invention's phase mask. After release of the mold, a solid phase plate with a bivortex configuration is obtained.

Example 2: Production of the Bivortex Phase Mask by a Spatial Light Modulator In another example, the bivortex phase mask of the present invention can be generated by a spatial light modulator device (SLM). Such SLM can be produced by integrating complementary metal-oxide-semiconductor (CMOS) in the SLM, by methods such as the ones described in the art (ZHU, et al 2004.), with the addition of comprising a step of: imprinting the present invention's bivortex phase mask onto the SLM, through electronic control of its sub-units.

Example 3: STED Microscopy Method Employing a Bivortex Phase Mask Through Compensation or Correction Functions Another example of an embodiment of the present invention refers to a method for STED microscopy that can be developed through comprising a step of: modulating the physical phase of a radiation beam on an existing phase plate or a spatial light modulator using compensation or corrective phase functions to ultimately generate the present invention's byvortex phase mask as the effective phase mask.

REFERENCES

ANTONELLO, J., KROMANN, E. B., BURKE, D., BEWERSDORF, J. & BOOTH, M. J. 2016. Coma aberrations in combined two- and three-dimensional STED nanoscopy. Opt Lett, 41, 3631-4.

BOOTH, M., ANDRADE, D., BURKE, D., PATTON, B. & ZURAUSKAS, M. 2015. Aberrations and adaptive optics in super-resolution microscopy. Microscopy (Oxf), 64, 251-61.

HARKE, B., ULLAL, C. K., KELLER, J., & HELL, S. W. 2008. Three-dimensional nanoscopy of colloidal crystals. Nano letters, 8(5), 1309-1313.

HELL, S. W. & WICHMANN, J. 1994. Breaking the diffraction resolution limit by stimulated emission: stimulated-emission-depletion fluorescence microscopy. Opt Lett, 19, 780-2.

KELLER, J., SCHONLE, A. & HELL, S. W. 2007. Efficient fluorescence inhibition patterns for RESOLFT microscopy. Opt Express, 15, 3361-71.

KLAR, T. A., JAKOBS, S., DYBA, M., EGNER, A., & HELL, S. W. 2000. Fluorescence microscopy with diffraction resolution barrier broken by stimulated emission. Proceedings of the National Academy of Sciences, 97(15), 8206-8210.

OEMRAWSINGH SS1, VAN HOUWELINGEN J A, ELIEL E R, WOERDMAN J P, VERSTEGEN E J, KLOOSTERBOER J G, 'T HOOFT G W. Production and characterization of spiral phase plates for optical wavelengths. Appl Opt. 2004 Jan. 20; 43(3):688-94.

TOROK, P. & MUNRO, P. 2004. The use of Gauss-Laguerre vector beams in STED microscopy. Opt Express, 12, 3605-17.

WESTPHAL, V. & HELL, S. W. 2005. Nanoscale resolution in the focal plane of an optical microscope. Phys Rev Lett, 94, 143903.

ZHU, H. BIERDEN, P., CORNELISSEN, S., et al. 2004. Advanced Wavefront Control: Methods, Devices, and Applications II, edited by John D. Gonglewski, Mark T. Gruneisen, Michael K. Giles, Proceedings of SPIE Vol. 5553 (SPIE, Bellingham, Wash.

Lisbon, May 17, 2019

The invention claimed is:

1. A phase plate or spatial light modulator device for Stimulated Emission Depletion (STED) and Reversible Saturable OpticaL Fluorescence Transitions (RESOLFT) microscopy, comprising:
at least two vortex sections, one inner disc-shaped vortex and one outer ring-shaped vortex, in a single phase mask, and
a bivortex profile phase mask ($\phi$) according to the mathematical function:

$$\phi(r, \theta) = \begin{cases} n\theta & \text{if } r < r_1 \\ n\theta + a\pi & \text{if } r_2 > r > r_1 \end{cases},$$

where r is the perpendicular distance to the optical axis, $\theta$ is the azimuthal angle and $r_1$ and $r_2$ define the radius of the inner and the outer vortex, respectively, n is an integer which equals 1 for best resolution and, a, which defaults to 1, is a parameter between 0 and 2, which can be used to refine the distribution of the beam energy along the optical axis.

2. The phase plate or spatial light modulator device according to claim 1 characterized by, a phase shift between the inner vortex and the outer vortex, which occurs at a variable distance from the optical axis.

3. The phase plate or spatial light modulator device according to claim 1, comprising a phase step between the inner vortex and the outer vortex which can be chosen to be of a magnitude between 0 and 2π radians.

4. The phase plate or spatial light modulator device according to claim 1, comprising a smoothened inter-vortex transition.

5. The phase plate or spatial light modulator device according to claim 1, comprising more than two vortex structures.

6. The phase plate or spatial light modulator device according to claim 1, comprising another arbitrary phase masks within or outside the bivortex regions.

7. A method for STED and RESOLFT microscopy characterized by, comprising a step of: modulating the physical phase of a optical beam using compensation or corrective phase functions on a phase plate or a spatial light modulator device to generate an effective phase mask as described in claim 1.

8. A method for STED and RESOLFT microscopy, comprising:
modulating the physical phase of an optical beam using a phase plate or a spatial light modulator device generating a phase mask comprising at least two vortex sections, one inner disc-shaped vortex and one outer ring-shaped vortex, in a single phase mask,
wherein the step is characterized by, comprising a bivortex profile phase mask ($\phi$) according to the mathematical function:

$$\phi(r, \theta) = \begin{cases} n\theta & \text{if } r < r_1 \\ n\theta + a\pi & \text{if } r_2 > r > r_1 \end{cases},$$

where r is the perpendicular distance to the optical axis, $\theta$ is the azimuthal angle and $r_1$ and $r_2$ define the radius of the inner and the outer vortex, respectively, n is an integer which equals 1 for best resolution and a, which defaults to 1, is a parameter between 0 and 2 which can be used to refine the axial distribution of the beam.

9. The method for STED and RESOLFT microscopy according to claim 8 in which the step of modulating the physical phase of an optical beam using a phase plate or a spatial light modulator device generating a phase mask is characterized by, comprising a phase shift between the inner vortex and the outer vortex, according to the radius of each vortex, with the inner vortex radius being most preferably smaller or equal to the radius of the outer vortex.

10. The method for STED and RESOLFT microscopy according to claim 8 in which the phase step is characterized by, having an arbitrary value, most preferably 1 π radians.

11. The method for STED and RESOLFT microscopy according to claim 8 in which the step is characterized by, comprising a smoothened inter-vortex transition.

12. The method for STED and RESOLFT microscopy according to claim 8 in which the step is characterized by, comprising more than 2 vortex structures.

13. The method for STED and RESOLFT microscopy according to claim 8 in which the step is characterized by, comprising other arbitrary phase masks within or outside the bivortex regions.

* * * * *